United States Patent
Kikukawa et al.

(10) Patent No.: US 8,189,443 B2
(45) Date of Patent: May 29, 2012

(54) METHOD FOR EVALUATING SIGNAL IN OPTICAL RECORDING AND READING AND METHOD FOR OPTICAL RECORDING AND READING

(75) Inventors: Takashi Kikukawa, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 674 days.

(21) Appl. No.: 12/115,040

(22) Filed: May 5, 2008

(65) Prior Publication Data

US 2008/0279066 A1 Nov. 13, 2008

(30) Foreign Application Priority Data

May 8, 2007 (JP) ................................. 2007-123003

(51) Int. Cl.
*G11B 7/00* (2006.01)
(52) U.S. Cl. .................. 369/59.22; 369/53.35; 369/53.1
(58) Field of Classification Search ............... 369/53.35, 369/53.36, 59.22
See application file for complete search history.

(56) References Cited

U.S. PATENT DOCUMENTS

| | | | |
|---|---|---|---|
| 5,121,263 A | 6/1992 | Kerwin et al. | |
| 2003/0174622 A1 | 9/2003 | Nagai et al. | |
| 2005/0193318 A1 * | 9/2005 | Okumura et al. | 714/795 |
| 2007/0030786 A1 | 2/2007 | Jansen et al. | |
| 2007/0274185 A1 * | 11/2007 | Kikukawa et al. | 369/59.1 |

FOREIGN PATENT DOCUMENTS

| | | |
|---|---|---|
| JP | 3144969 A | 6/1991 |
| JP | 8195037 A | 7/1996 |
| JP | 10320931 A | 12/1998 |
| JP | 2000222737 A | 8/2000 |
| JP | 2003272304 A | 9/2003 |
| JP | 2003323770 A | 11/2003 |
| JP | 2007501991 A | 2/2007 |

* cited by examiner

*Primary Examiner* — Adam R Giesy
(74) *Attorney, Agent, or Firm* — Porzio, Bromberg & Newman, P.C.

(57) ABSTRACT

A signal quality evaluation method is provided that can objectively evaluate signal quality regardless of a PRML detection method used. The signal quality evaluation method is used when recording and reading is performed by irradiating a medium with a laser beam having a wavelength of $\lambda$ through an objective lens having a numerical aperture of NA. In the signal quality evaluation method, information of the difference between an ideal signal recoded in the medium and a real signal obtained by irradiating the medium with the laser beam is statistically analyzed for each signal level of the ideal signal. The evaluation of the quality of the real signal is made using the statistics obtained by the statistical analysis.

19 Claims, 6 Drawing Sheets

| 25 GB jitter-best strategy | Average for level 0 | Variance for level 0 | Average for level 1 | Variance for level 1 | Average for level 2 | Variance for level 2 |
|---|---|---|---|---|---|---|
| Strategy 1 | 0 | 17.73952402 | 52.37771971 | 16.48879624 | 116.7836579 | 10.78779852 |
| Strategy 2 | 0 | 18.7978522 | 56.72920118 | 16.70561512 | 119.8591805 | 9.774084632 |
|  | 0 | 13.53666039 | 36.74047528 | 15.68976739 | 80.3847213 | 16.37796268 |

| 25 GB jitter-best strategy | Average for level 3 | Variance for level 3 | Average for level 4 | Variance for level 4 | Average for level 5 | Variance for level 5 |
|---|---|---|---|---|---|---|
| Strategy 1 | 105.7672456 | 21.17141708 | 141.9392243 | 25.68873218 | 176.0740344 | 20.04927236 |
| Strategy 2 | 111.0173926 | 20.18699923 | 144.8974847 | 22.65270145 | 178.8786749 | 20.25825236 |
|  | 76.63195009 | 23.48779144 | 104.1011679 | 30.49358905 | 144.3759477 | 31.8463777 |

| 25 GB jitter-best strategy | Average for level 6 | Variance for level 6 | Average for level 7 | Variance for level 7 | Average for level 8 | Variance for level 8 |
|---|---|---|---|---|---|---|
| Strategy 1 | 168.66411 | 11.05498883 | 225.305316 | 11.28195878 | 256 | 8.884444847 |
| Strategy 2 | 167.5177479 | 8.805359225 | 232.0529489 | 10.52748055 | 256 | 8.281151582 |
|  | 104.4934063 | 12.13731289 | 218.2710192 | 13.84004835 | 256 | 12.3112247 |

Fig. 6

METHOD FOR EVALUATING SIGNAL IN OPTICAL RECORDING AND READING AND METHOD FOR OPTICAL RECORDING AND READING

BACKGROUND OF THE INVENTION

1. Field of the Invention

The present invention relates to a method for evaluating the quality of a read signal when optical recording and reading is performed using a laser beam and to a method for optical recording and reading by means of the quality evaluation method.

2. Description of the Related Art

Conventionally, optical recording mediums such as CD-DAs, CD-ROMs, CD-Rs, CD-RWs, DVD-ROMs, DVD-Rs, DVD+/−RWs, and DVD-RAMs are widely used for viewing digital video and for recording digital data. The recording capacity required for such optical recording medium has been increasing every year. To meet this requirement, the so-called next generation DVDs capable of storing large video and data files have begun to be commercialized. In such next generation DVDs, the increase in recording capacity is achieved by reducing the wavelength of a laser beam used for recording and reading to 405 nm.

For example, in the Blu-ray Disc (BD) standard, which is one of the next generation DVD standards, the numerical aperture of an objective lens is set to 0.85, whereby as much as 25 GB of data can be recorded in and read from one recording layer. However, it is expected that the size of video and computer data files will further increase in the future. Accordingly, it is contemplated to increase the capacity of a disc by reducing the size of recording marks so that the linear recording density in each layer is increased.

Meanwhile, under optical recording and reading conditions in which a laser beam having a wavelength of $\lambda$ and an objective lens having a numerical aperture of NA are used, a so-called resolution limit exists. Specifically, when a encoded signal contains a sequence of a recording mark and a space each having a size equal to or less than $1.0 \times \lambda/(4 \times NA)$, the amplitude of the read signal from the mark-space sequence is substantially zero. In the current standards of the above CD, DVD, and BD, the size of the minimum recording mark in a encoded signal is greater than $1.0 \times \lambda/(4 \times NA)$, and therefore the resolution limit is not reached. Hence, an amplitude sufficient for reading a signal can be obtained for any combination of recording marks and spaces by using an appropriate equalizer. Therefore, by slicing a read signal at a certain voltage level, the quality of the record and read signal can be evaluated according to the information of the position of the intersection of the slice level and the amplitude curve of the read signal (or to edge jitter).

According to the studies of the present inventors, when the size of recording marks is reduced such that the minimum size is equal to or less than $1.1 \times \lambda/(4 \times NA)$, the amplitude of a signal from a sequence of a recording mark and a space each having the minimum size is below a practically acceptable level. Moreover, when the size of the recording marks is reduced to $1.0 \times \lambda/(4 \times NA)$ or less, the amplitude becomes identically zero due to the resolution limit, so that the signal evaluation using the edge jitter cannot be made.

As a technique for avoiding such a problem, there is a PRML (Partial Response Maximum Likelihood) detection method in which a PR equalizer and an ML decoder (such as a Viterbi decoder) are used. The PR equalizer has a function of correcting an actual read signal to match the corrected signal to a reference PR characteristic. A coefficient used for the correction is called an equalization coefficient, and a plurality of equalization coefficients corresponding to different amplitudes of the read signal are used in the PR equalizer.

In the PRML detection method, when a PR (1, 2, 1) characteristic with a constraint length of 3, for example, is used, an impulse response from an actual recorded bit is represented by a sequence having an amplitude of PR (h1, h2, h3). Therefore, in the PR equalizer, the equalization coefficients are used to match the read signal having an amplitude of PR (h1, h2, h3) to the reference PR (1, 2, 1) characteristic, whereby noise components are eliminated.

The ML decoder computes the deviation of the signal sequence equalized by the PR equalizer from each of all possible ideal responses and selects one ideal response having a minimum cumulative deviation (this ideal response is referred to as a maximum likelihood ideal response). An identified signal is obtained from the maximum likelihood ideal response. In this manner, a correct identified signal can be extracted even when the read signal has a small amplitude and is embedded in noise.

The characteristics of individual optical recording mediums differ from each other, and also the characteristics of optical heads of individual reading devices differ from each other. In order to cope with the differences, the equalization coefficients used in the PR equalizer are adjusted, or an optimal PR equalizer is selected. In addition, an optimal decoder is selected as the ML decoder.

As has been described, the PRML detection method is basically a reading technique. Therefore, the error rate of a signal obtained using the PRML detection method largely depends on, in addition to the recording medium used and the recording strategy used, the types of signal processing techniques such as PR equalization and ML decoding. The linear recording density in each layer will be increased in the future. In such a circumstance, various combinations of PR equalization and ML decoding methods can be used. Therefore, it is quite difficult to select an appropriate PRML detection method according to a unified standard or the like.

Meanwhile, even in a recording and reading system in which the PRML detection method is used, it is highly necessary to reasonably and objectively evaluate the level of the quality of a record and read signal. However, as has been described, the selection of the PR equalization and ML decoding methods used in the PRML detection method depends on the discretion of individual manufacturers. Therefore, the level of the quality of a record and read signal depends on the selected PR equalization and ML decoding methods, and therefore the objectivity of the quality level is not guaranteed. Specifically, the error rate of an identified signal obtained using the selected PRML detection method is an evaluated value that is effective only for the system used, and therefore the quality of the optical recording medium itself and the suitability of the selected recording strategy cannot be determined from the error rate. In addition, in the recording and reading device, the suitability of the combination of the provided optical recording medium and the selected recording strategy cannot be determined only from the error rate.

SUMMARY OF THE INVENTION

The present invention has been made in view of the above problems. Accordingly, it is an object of the invention to provide a signal evaluation method that depends less on information processing methods such as the PRML detection method and can simply evaluate a signal with high objectivity.

The above object is achieved by the following means obtained by the extensive studies by the inventors.

A first aspect of the present invention for achieving the foregoing object is a method for evaluating a signal when recording and reading is performed by irradiating a medium with a laser beam having a wavelength of λ through an objective lens having a numerical aperture of NA, the method including: statistically analyzing information of a difference between an ideal signal recoded in the medium and a real signal obtained by irradiating the medium with the laser beam, the information being statistically analyzed for each signal level of the ideal signal or for each type of bit sequences; and evaluating the quality of the real signal using a statistic obtained by the statistical analysis.

A second aspect of the present invention for achieving the foregoing object is the signal evaluation method according to the first aspect, wherein a minimum size of recording marks to be recorded in the medium is equal to or less than $1.1 \times \lambda/(4 \times NA)$.

A third aspect of the present invention for achieving the foregoing object is the signal evaluation method according to the first or second aspect, wherein a maximum likelihood ideal signal obtained from the real signal by means of a PRML detection method is used as the ideal signal recorded in the medium.

A fourth aspect of the present invention for achieving the foregoing object is the signal evaluation method according to the first or second aspect, wherein a signal computed from a known data sequence stored in storage means other than the medium is used as the ideal signal in place of the ideal signal recorded in the medium.

A fifth aspect of the present invention for achieving the foregoing object is the signal evaluation method according to any of the first to fourth aspects, wherein a level evaluation statistic obtained by statistically analyzing a level difference between a signal level of the ideal signal and a corresponding signal level of the real signal is used as the statistic.

A sixth aspect of the present invention for achieving the foregoing object is the signal evaluation method according to the fifth aspect, wherein a level difference between an average level value of the real signal at each signal level and a corresponding signal level of the ideal signal is used as the level evaluation statistic.

A seventh aspect of the present invention for achieving the foregoing object is the signal evaluation method according to the fifth aspect, wherein a level difference between a mode of the real signal at each signal level and a corresponding signal level of the ideal signal is used as the level evaluation statistic.

An eighth aspect of the present invention for achieving the foregoing object is the signal evaluation method according to any of the fifth to seventh aspects, wherein the quality of the real signal is evaluated using linearity of the level evaluation statistic.

A ninth aspect of the present invention for achieving the foregoing object is the signal evaluation method according to any of the first to eighth aspects, wherein a variation evaluation statistic obtained by statistically analyzing the degree of level variations in the real signal at each signal level with respect to a corresponding signal level of the ideal signal is used as the statistic.

A tenth aspect of the present invention for achieving the foregoing object is the signal evaluation method according to the ninth aspect, wherein variance of the real signal at each signal level with respect to a corresponding signal level of the ideal signal is used as the variation evaluation statistic.

An eleventh aspect of the present invention for achieving the foregoing object is an optical recording and reading method for performing recording and reading by irradiating a medium with a laser beam having a wavelength of λ through an objective lens having a numerical aperture of NA, the method including: evaluating a signal by means of the signal evaluation method according to any of the first to tenth aspects before or during the recording and reading; and adjusting a recording strategy based on the results of the evaluation.

The present invention has an advantage that the quality of a signal can be evaluated objectively even when the size of recording marks is further reduced.

BRIEF DESCRIPTION OF THE DRAWINGS

The above and other objects, features and advantages of the present invention will become apparent from the following description and appended claims, taken in conjunction with the accompanying drawings.

FIG. 6 is a table showing the evaluation results of the Examples that are obtained by means of the signal evaluation method.

DETAILED DESCRIPTION OF THE PREFERRED EMBODIMENTS

Hereinbelow, examples of the preferred embodiments of the present invention will be described in detail with reference to the drawings.

Figure 1:
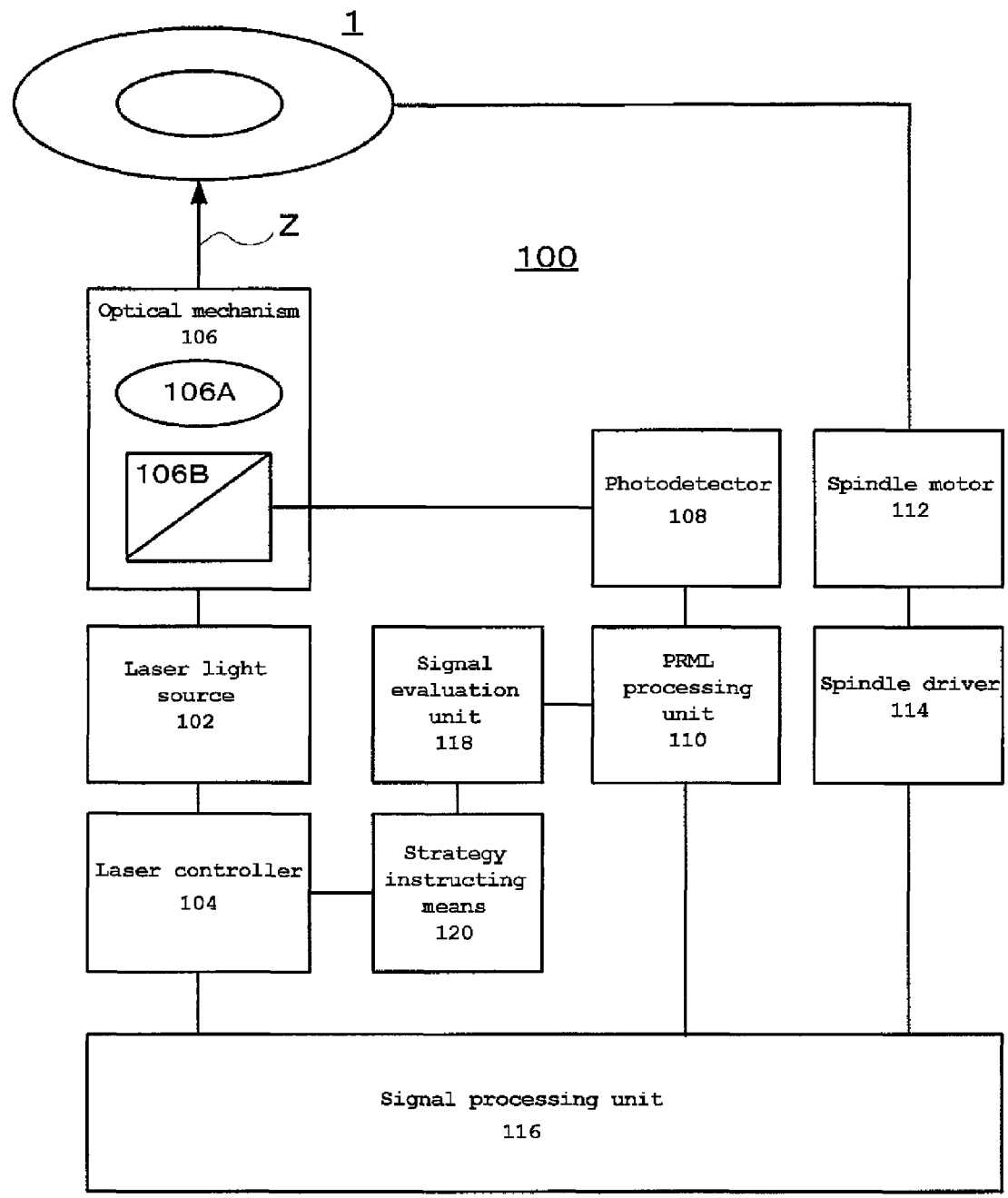
FIG. 1 is a block diagram illustrating the configuration of a reading apparatus for performing a signal evaluation method and an optical recording and reading method according to an embodiment of the present invention.

FIG. 1 shows the configuration of a reading apparatus 100 which embodies a signal evaluation method and an optical recording and reading method according to the preferred embodiments of the present invention. The reading apparatus 100 includes: a laser beam source 102 which generates a laser beam Z used for reading; a laser controller 104 which controls the laser beam source 102; an optical mechanism 106 which guides the laser beam Z onto an optical recording medium 1; a photodetector 108 which detects the reflection of the laser beam Z; a PRML processing unit 110 which decodes the information detected by the photodetector 108 by means of a PRML detection method; a spindle motor 112 which rotates the optical recording medium 1; a spindle driver 114 which controls the rotation of the spindle motor 112; a signal processing unit 116 which exchanges decoded read data with a CPU (central processing unit, not shown); a signal evaluation unit 118 which performs signal quality evaluation using an undecoded real signal from the PRML processing unit 110 and an ideal signal (identified signal) obtained by the PRML processing unit 110; and strategy instructing means 120 which instructs the laser controller 104 to change a recording strategy based on the evaluation results from the signal evaluation unit 118.

The laser beam source 102 is a semiconductor laser and is controlled by the laser controller 104 to generate the laser beam Z. The optical mechanism 106 includes an objective lens 106A and a polarization beam splitter 106B and can appropriately adjust the focus of the laser beam Z on an information recording layer. The polarization beam splitter 106B extracts the beam reflected from the information recording layer and guides the reflected beam to the photodetector 108. The photodetector 108 receives the reflection of the laser beam Z, converts the received beam to an electrical signal, and outputs the electrical signal to the PRML processing unit 110 as a read signal. The PRML processing unit 110 decodes the read signal and outputs the decoded binary identified signal to the signal processing unit 116.

In the reading apparatus 100, the wavelength λ of the laser beam Z is set to 400 to 410 nm. In addition, the numerical aperture NA of the objective lens 106A of the optical mechanism 106 is set to 0.84 to 0.86. More specifically, the wavelength λ of the laser beam Z is set to 405 nm, and the numerical aperture NA of the objective lens 106A is set to 0.85. To initiate reading of information recorded in the optical recording medium 1, the laser beam Z having a predetermined reading power is generated from the laser beam source 102, and the laser beam Z is projected onto the information recording layer of the optical recording medium 1. The laser beam Z is reflected from the information recording layer, is extracted through the optical mechanism 106, and is converted to a real read signal (hereinafter referred to as a real signal) by the photodetector 108.

Figure 2A:
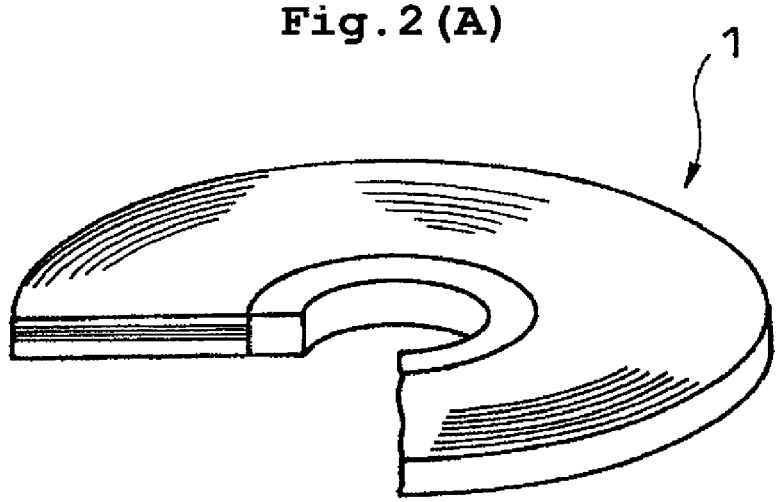
FIGS. 2(A) and 2(B) are enlarged views illustrating the configuration of an optical recording medium used in the reading apparatus.
Figure 2B:
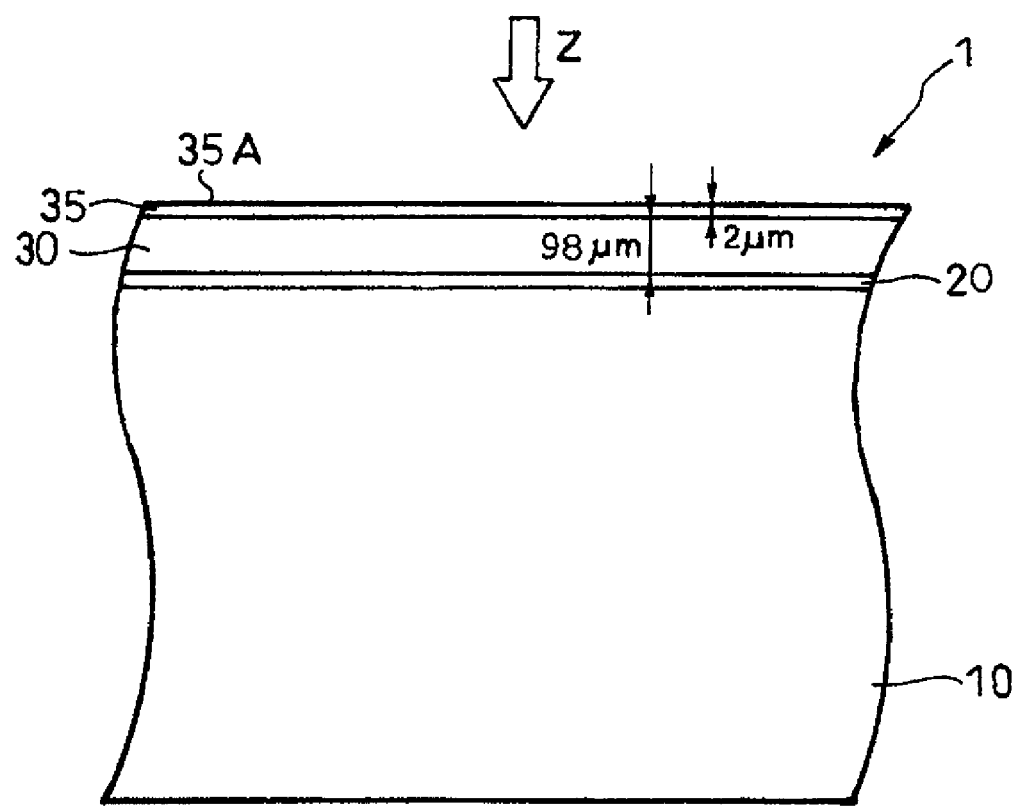

As shown in FIG. 2(A), the optical recording medium 1 is a disc-like medium having an outer diameter of approximately 120 mm and a thickness of approximately 1.2 mm. As enlarged in FIG. 2(B), the optical recording medium 1 includes a substrate 10, an information recording layer 20, a cover layer 30, and a hard coat layer 35 which are stacked in that order. The cover layer 30 and the hard coat layer 35 can transmit light and allow the laser beam Z incident from the outside to pass therethrough. Therefore, the laser beam Z incident from a light incident surface 35A passes through the hard coat layer 35 and the cover layer 30 in this order and reaches the information recording layer 20, whereby the information stored in the information recording layer 20 is read. In this optical recording medium 1, the recording capacity of the information recording layer 20 is set to 33.3 GB.

The substrate 10 is a disc-like member having a thickness of approximately 1.1 mm, and various materials such as glass, ceramic, and resin can be used as the material therefor. In this case, a polycarbonate resin is used. Examples of the usable resin include, in addition to polycarbonate resins, olefin resins, acrylic resins, epoxy resins, polystyrene resins, polyethylene resins, polypropylene resins, silicone resins, fluororesins, ABS resins, and urethane resins. Of these, the polycarbonate resins and the olefin resins are preferred in terms of workability and moldability. Moreover, grooves and lands, pit rows, or the like are formed on the surface on the information recording layer side of the substrate 10, in accordance with applications.

Various materials may be used as the material for the cover layer 30. However, a light-transmitting material must be used for allowing the laser beam Z to pass therethrough as described above. Preferably, an ultraviolet curable acrylic resin, for example, is used. In this optical recording medium 1, the thickness of the cover layer 30 is set to 98 μm, and the thickness of the hard coat layer 35 is set to 2 μm. Therefore, the distance between the light incident surface 35A and the information recording layer 20 is approximately 100 μm. Hence, the optical recording medium 1 conforms to the standard of the current Blu-ray disc except the recording capacity (25 GB at the time of the present application).

The information recording layer 20 is a layer for storing data. Examples of the data storage form include a read-only type in which data is written in advance and cannot be overwritten and a recording type in which a user can write data. In addition, the recording type is classified into a write-once type and a rewritable type. In the write-once type, data cannot be rewritten in areas in which data has already been written. In the rewritable type, written data can be erased, and new data can be rewritten in the areas in which the old data has been erased. In this embodiment, the information recording layer 20 may be any of the read-only type and the recording type.

The recording capacity of the information recording layer 20 is determined based on the combination of the size (area) of a recording region and the recording density. The size of the recording region is physically limited. Therefore, in the present embodiment, the recording density is increased by increasing the linear density of recording marks, i.e., reducing the length of a unit recording mark in a tangential direction. In other words, the recording capacity is increased by reducing the spiral direction length of a minimum mark of the recording marks formed in the information recording layer 20. In the present embodiment, the length of the minimum mark is set to $1.1 \times \lambda/(4 \times NA)$ or less, and preferably $1.0 \times \lambda/(4 \times NA)$ or less.

A description will now be given of the PRML processing unit 110 and the PRML (Partial Response Maximum Likelihood) detection method. In the PRML detection method, a reference class characteristic of the PR (Partial Response) is appropriately selected according to reading characteristics. For example, a constraint length 5 (1, 2, 2, 2, 1) characteristic is selected as the reference class characteristic of the PR. The constraint length 5 (1, 2, 2, 2, 1) characteristic means that a reading response from a sign bit "1" constrains five bits and that the waveform of the reading response can be represented by a sequence "12221." It is assumed that a reading response from any of various actually recorded sign bits is formed by convolution with the sequence "12221." For example, the response from a sign bit sequence of 00100000 is 00122210. Similarly, the response from a sign bit sequence of 00010000 is 00012221. Therefore, the response from a sign bit sequence of 00110000 is obtained by convolution of the above two responses and is 00134431. Moreover, the response from a sign bit sequence of 001110000 is 001356531. As described above, when the constraint length 5 (1, 2, 2, 2, 1) characteristic is used, the response obtained, for example, by convolution takes nine levels from 0 to 8.

The above responses obtained using the PR class characteristic are obtained by assuming an ideal state. In this sense, the above responses are referred to as ideal responses. Of course, the actual responses deviate from the ideal responses since the actual responses contain noises. Therefore, an actual response containing noises is compared with pre-estimated ideal responses, and one ideal response is selected such that the difference (distance) therebetween is minimum. Then, a decoded signal (identified signal) is obtained from the selected ideal response. This scheme is referred to as the ML (Maximum Likelihood) detection. For example, when a recorded sign bit "1" is read, the read signal can be close to "12221." In this case, by subjecting the read signal to the PRML detection processing using the constraint length 5 (1, 2, 2, 2, 1), an ideal response "12221" is selected which corresponds to the read signal. Then, an identified signal "1" is obtained by decoding the selected ideal response.

In the ML detection, the Euclidean distance, for example, is used for computing the difference between an ideal response and an actual response. The Euclidean distance E between an actual read sequence A (=A0, A1, ..., An) and an ideal response sequence B (=B0, B1, ..., Bn) is defined as $E=\sqrt{\{\Sigma(Ai-Bi)^2\}}$. Therefore, an actual response is compared with a plurality of pre-estimated ideal responses by using the Euclidian distance, and the results are ranked according to the Euclidian distance. Then, an ideal response having the smallest Euclidian distance (referred to as a maximum likelihood ideal response) is selected.

Figure 3:
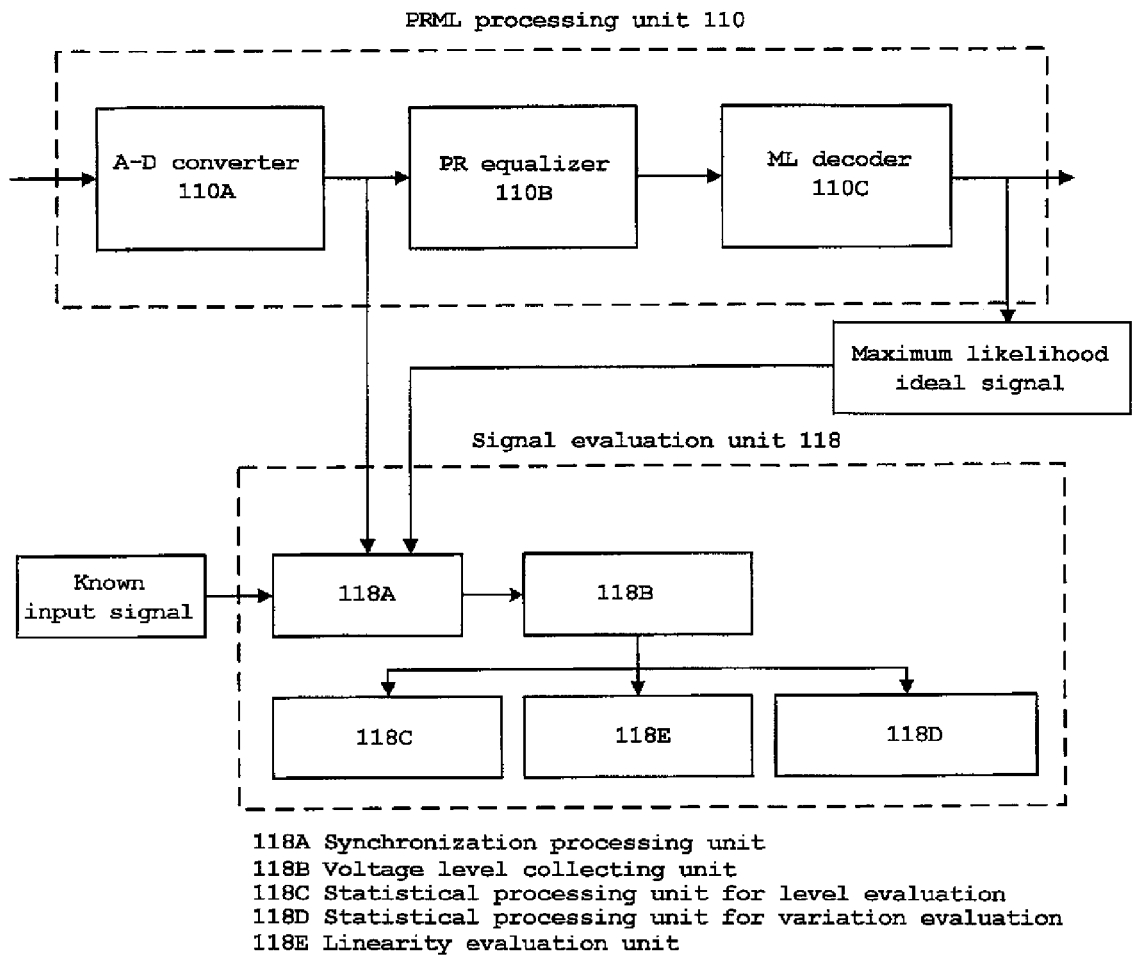
FIG. 3 is a block diagram illustrating the internal configuration of a PRML processing unit and a signal evaluation unit used in the reading apparatus.

As shown in FIG. 3, the PRML processing unit 110 that performs decoding processing according to the PRML detection method includes an A-D converter 11A, a PR equalizer 110B, and an ML decoder 110C. The A-D converter 110A converts an electrical analog signal detected by the photodetector 108 to a digital signal serving as a read signal. The PR equalizer 110B starts sampling of the read signal at a certain reference point, and the sampling is repeated at a predetermined clock frequency. Then, the PR equalizer 110B performs equalization processing such that the voltage level of the sampled signal comes close to a value defined by the reference class characteristic of the PR used. When the PR reference class is the constraint length 5 (1, 2, 2, 2, 1) characteristic, the ideal response takes nine levels. Therefore, in the PR equalizer 110B, the number of equalization coefficients (Tap coefficients) required for equalizing the read signal is 9 (9 taps are required).

Figure 4:
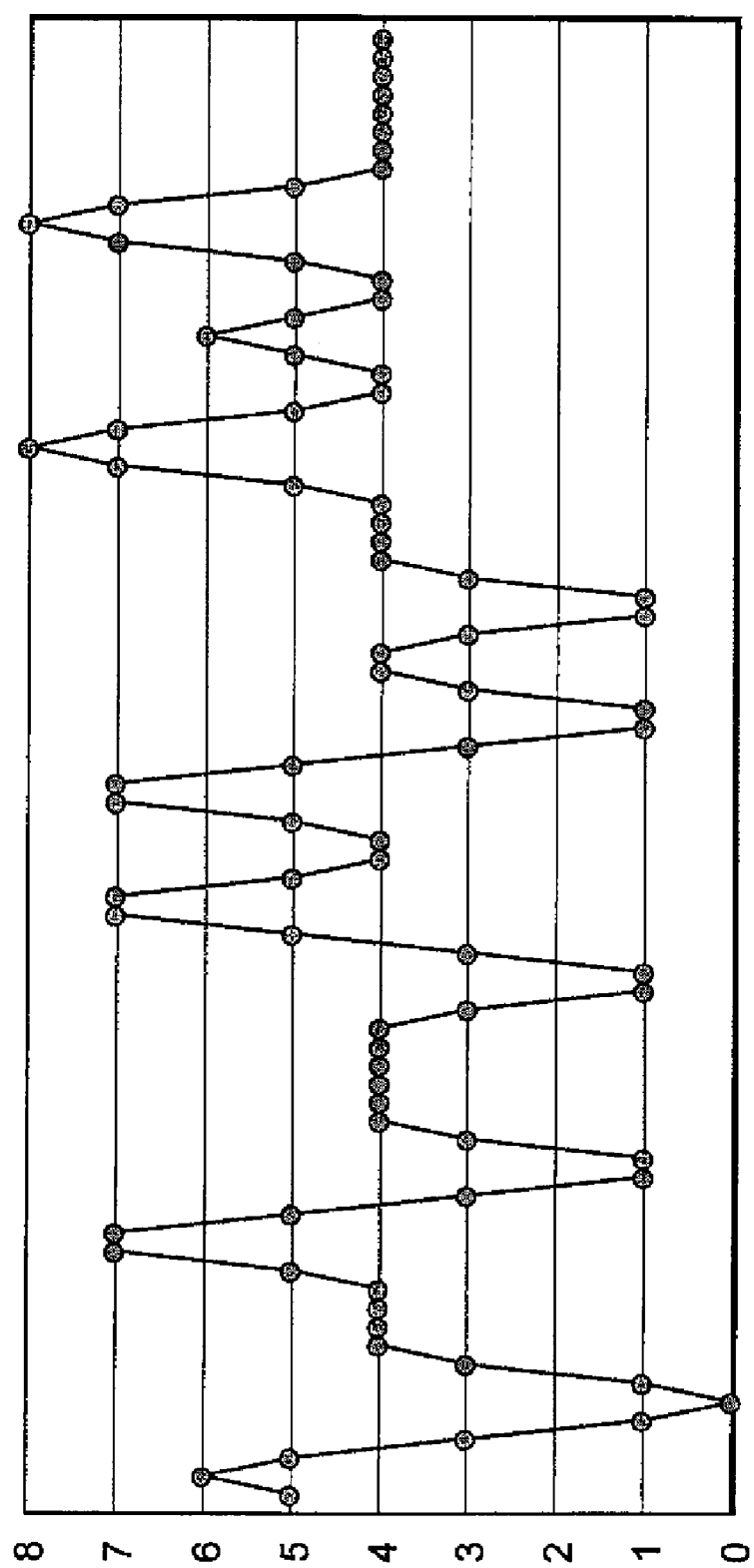
FIG. 4 is a graph showing an example of the waveform of an ideal signal used in the signal evaluation method.
Figure 5A:
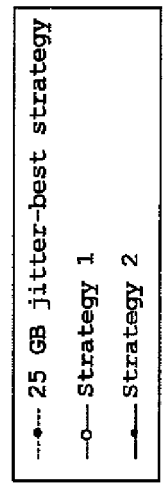
FIGS. 5(A) and 5(B) is a set of graphs showing the evaluation results of Examples that are obtained by means of the signal evaluation method.
Figure 5A:
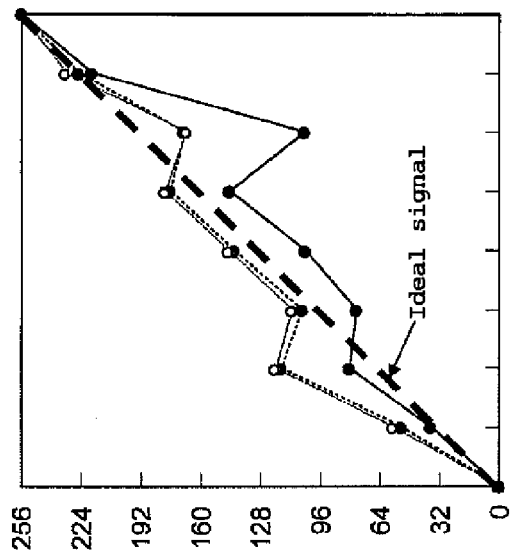
Figure 5B:
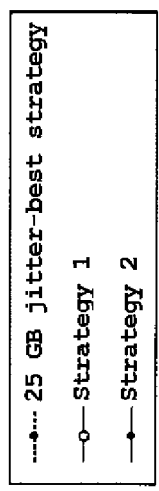
Figure 5B:
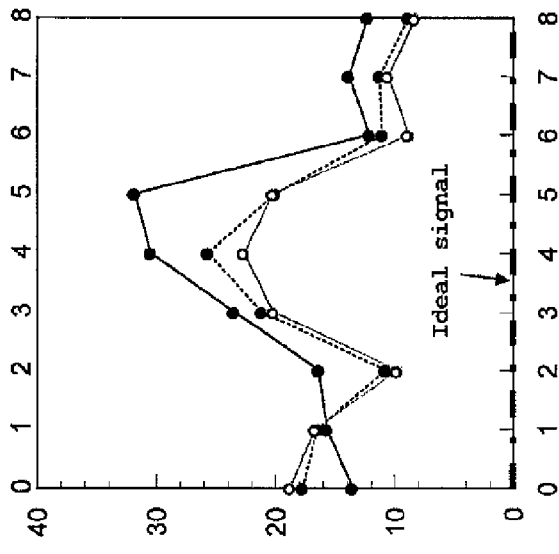

The PR equalizer 110B is described by way of a specific example. In this specific example, the recoding density is designed such that a encoded signal is (1,7) RLL, and an input signal is 0011100000110011110000 1100110000 1111 0011110000110000110011111001110011111100110011. In addition, the PR reference class is represented by the constraint length 5 (1, 2, 2, 2, 1) characteristic. In this case, an ideal waveform is obtained by subjecting the input signal to convolution and is shown in FIG. 4. This waveform is a known ideal waveform. Therefore, when the sampling of the voltage value of the read waveform is started at a certain reference point and is continued at a predetermined clock frequency, the voltage value takes nine integer values of from 0 to 8. However, the levels of the waveform of a real signal obtained by reading the optical recording medium 1 are non-integer values because the recording marks are deformed due to the influence of the physical and chemical properties of the material used for the optical recording medium 1 and the influence of the recording strategy.

In this specific example, a Viterbi decoder is used as the ML decoder 110C, and a most likelihood ideal response is selected according to the signal equalized by the PR equalizer 110B, whereby an identified signal is obtained. Specifically, the difference (Euclidian distance) between the equalized signal and each pre-estimated ideal response is computed, and one ideal response giving the smallest difference is selected.

The signal evaluation unit 118 includes a synchronization processing unit 118A, a voltage level collecting unit 118B, a statistical processing unit 118C for level estimation, a statistical processing unit 118D for variation estimation, and a linearity evaluation unit 118E. In the signal evaluation unit 118, the difference between the digitized real signal obtained through the A-D converter 110A of the PRML processing unit 110 and a known ideal signal or the difference between the digitized real signal and an ideal signal obtained by decoding the real signal using the PRML processing unit 110 (most likelihood ideal signals) is statistically analyzed. In this manner, the quality of the real signal is evaluated.

In the synchronization processing unit 118A, the waveform of the ideal signal is synchronized with the waveform of the real signal sampled at the clock frequency. Any synchronization method may be used. For example, a specific pattern in the ideal signal may be used as a signal for synchronization, or a PLL is used for synchronization. The ideal signal used is different depending on whether the input signal (recorded signal) is known or unknown. When the signal recorded in the optical recording medium 1 is unknown, a most likelihood ideal signal obtained by decoding the real signal from read data using the PRML processing unit 110 is used as the ideal signal. When the signal recorded in the optical recording medium 1 is known, i.e., this signal is stored in storage means other than the optical recording medium 1, the stored signal is used in place of the ideal signal having been recorded in the optical recording medium 1. The required signal can be obtained by subjecting the known signal (input signal) to convolution with a reference class characteristic (for example, a constraint length 5 (1, 2, 2, 2, 1) characteristic).

In the voltage level collecting unit 118B, the voltage values of the real signal which correspond to the signal levels of an ideal waveform are collected for each signal level. In the present embodiment, the signal level of the ideal waveform takes nine levels of from 0 to 8. Therefore, the voltage values of the real signal are collected according to the nine levels from 0 to 8. For example, voltage values of the waveform of the real signal which correspond to level 0 of the ideal waveform are collected. Similarly, voltage values of the waveform of the real signal which correspond to each of levels 1 to 8 of the ideal waveform are collected.

In the statistical processing unit 118C for level estimation, the average of the collected values of the real signal is computed for each signal level, and the average is compared with the corresponding signal level of the ideal signal to compute the level difference. If the waveform of the ideal signal (ideal waveform) agrees completely with the waveform of the real signal, the level difference is zero. Practically, since the real signal differs from the ideal signal, the level difference is not zero.

In the statistical processing unit 118D for variation estimation, the variance of the collected values is computed for each signal level. The variance is zero if the ideal waveform agrees completely with the waveform of the real signal but is not zero in actual cases.

In the linearity evaluation unit 118E, the results obtained in the statistical processing unit 118C for level estimation are plotted, for example, such that the signal level value of the ideal signal is plotted on the horizontal axis and the average value of the real signal is plotted on the vertical axis. Then, the linearity of the plot is evaluated. If the ideal waveform agrees completely with the waveform of the real signal, the linearity of the plot is perfect (the plot is linear). However, since the real signal differs from the ideal signal, the perfect linearity is not obtained in actual cases.

The difference between the waveform of the real signal and the waveform of the ideal signal can be evaluated objectively by means of the above signal evaluation unit 118. The suitability of the combination of the optical recording medium 1 and the recording strategy can be determined based on the linearity of the real signal, or on the variance at each signal level. Specifically, the higher the linearity, or the closer the variance to zero, the better the suitability.

The strategy instructing means 120 controls the reading power of the laser controller 104 and the recording strategy. Specifically, while real data and data for quality evaluation recorded in an OPC (Optimum Power Control) region of the optical recording medium 1 are read, the signal evaluation unit 118 evaluates the read signal. According to the evaluation results, the strategy instructing means 120 changes the recording strategy and controls the reading power of the laser controller 104.

A description will now be given of Examples in which, when the input signal is known, the real signal is evaluated using the signal evaluation unit 118.

A stacking of a polycarbonate substrate (1.1 mm), a $TiO_2$ layer (4 nm), an $Fe_2O_3$ layer (3 nm), a $TiO_2$ layer (6 nm), a Bi—Ge—O layer (35 nm), a $TiO_2$ layer (8 nm), and a light transmitting ultraviolet curable resin layer (0.1 mm) was used as the optical recording medium 1. The optical recording medium 1 was evaluated using an optical disc evaluation apparatus (ODU-1000, product of Pulstec Industrial Co., Ltd.) with a wavelength $\lambda$ of 405 nm and a numerical aperture NA of 0.85. To evaluate recording and reading, the clock frequency was set to 66 MHz, and the linear rotation speed of the disc was set to 3.69 m/s. In addition, a (1, 7) RLL input signal composed of binary data of approximately 10,000 to approximately 20,000 clock cycles was read. Under the above evaluation conditions, the physical size of the smallest recording mark in the encoded signal was approximately 113 nm and was smaller than $1.0 \times \lambda/(4 \times NA) = 119$ nm. In the physical specification of BD, this enables a 12 cm disc to have a capacity corresponding to 33.3 GB in one layer.

First, recording was performed on the optical recording medium 1 using a recording strategy which gives jitter-best (best quality) when a recording density corresponding to a capacity of 25 GB is used. In practice, the recording was performed under the above evaluation conditions for a capacity of 33.3 GB. Next, the waveform of the outputted real signal was digitized using the A-D converter 110A (digital oscilloscope, product of LeCroy Corporation) to give reflected voltage values with respect to time. Subsequently, the real signal was synchronized with a known input signal by using a synchronization signal contained in a specific pattern in the known input signal, and the voltage value of the waveform of the real signal was sampled at the clock frequency. The waveform of the real signal obtained by the sampling was a waveform before signal processing using the PR equalizer 110B. In terms of reliability, it is preferable that a long signal be used as the specific pattern for synchronization contained in the known input signal. Therefore, a pattern sequence containing a 9T mark and a 9T space was used.

The known input signal was subjected to convolution with a PR reference characteristic of a constraint length 5 (1, 2, 2, 2, 1) and was converted to an ideal signal to compute its waveform.

Next, in the synchronization processing unit 118A, the waveform of the real signal obtained by the sampling was synchronized with the waveform of the ideal signal. Subsequently, in the voltage level collecting unit 118B, the voltage values of the waveform of the real signal which are synchronized with level 0 of the waveform of the ideal signal were collected. Then, the average and variance of the collected voltage values were computed in the statistical processing unit 118C for level estimation and the statistical processing unit 118D for variation estimation, respectively.

Similarly, the voltage values of the waveform of the real signal which are synchronized with level 1 were collected, and the average and variance of the collected voltage values were computed. Subsequently, the same collection and computation operations were repeated for levels 2 to 8. In addition, in the linearity evaluation unit 118E, the data was normalized. Specifically, the average of the collected voltage values of the waveform of the real signal that correspond to level 0 of the ideal signal is set to zero, and the average of the collected voltage values of the waveform of the real signal that correspond to level 8 is set to 256. Then, the linearity of the data was evaluated.

Similar measurement was performed under the same conditions as those used in the above evaluation method. In this case, two recording strategies (recording strategies 1 and 2) were used which were prepared by modifying the above recording strategy giving the jitter-best at 25 GB. Specifically, in these recording strategies 1 and 2, light emitting timing and the like were changed from those of the above recording strategy giving the jitter-best at 25 GB.

For a reference purpose, recording and reading was performed at a recording density of 33.3 CB by using the recording strategy 1. In this case, the bit error rate of the read signal decoded by the PRML processing unit 110 was about one-tenth of that when recording and reading was performed at a recording density of 33.3 GB by using the recording strategy giving the jitter-best at 25 GB. Therefore, good results were obtained. Furthermore, recording and reading was performed at a recording density of 33.3 GB by using the recording strategy 2. In this case, the bit error rate of the read signal decoded by the PRML processing unit 110 deteriorated greatly, i.e., was about 25 times that when recording and reading was performed at a recording density of 33.3 GB by using the recording strategy giving the jitter-best at 25 GB.

The evaluation results of the Examples were shown in FIGS. 5 and 6. FIG. 5(A) shows the results of the analysis of the linearity of the average value of the voltage levels of the real signal, and FIG. 5(B) shows the results of the analysis of the variance of the real signal. FIG. 6 is a table showing the actual numerical values used in FIGS. 5(A) and 5(B). As can be seen from the above results, the linearity of the signal obtained by using the recording strategy giving the jitter-best at 25 GB was not largely different from the linearity of the signal obtained by using the recording strategy 1. However, the variance of the signal obtained by using the recording strategy 1 was better than that of the signal obtained by using the recording strategy giving the jitter-best at 25 GB. That is, the quality determination results according to the evaluation results shown in FIGS. 5(A) and 5(B) are similar to the quality determination results according to the bit error rate.

Meanwhile, the comparison between the recording strategy 2 and the recording strategy giving the jitter-best at 25 GB shows that the linearity of the average values of the voltage levels and the variance were better for the case where the recording strategy giving the jitter-best at 25 GB was used. These results also agree with the above evaluation results of the bit error rate.

In the above signal evaluation method and optical recording and reading method of the present embodiment, the difference between the ideal signal and the real signal is aggregated for each signal level, and the results are statistically analyzed. Therefore, the quality of the signal can be objectively evaluated regardless of the type of the PRML processing unit 110 used for decoding the real signal. Moreover, the evaluation is not based on the entire waveform of the real signal but on statistical analysis for each signal level of that signal. Hence, even when the waveform of the real signal is disturbed by an accidental disturbance, the deterioration of the quality evaluation results can be reduced. Therefore, the suitability of the recording and reading system itself can be objectively evaluated. In addition, even in the reading apparatus 100 in which the PRML detection method is used, the quality of the optical recording medium 1, the quality of the recording strategy, the compatibility between the optical recording medium 1 and the recording strategy, and the like can be determined.

In particular, in the evaluation method of the present embodiment, the difference between the waveform of the real read signal and the waveform of the ideal signal obtained by convolution with a predetermined reference class characteristic is statistically analyzed. Therefore, the evaluation can be objectively made even on regions in which the minimum size of the recording marks is 1.1×λ/4/NA or less and therefore the evaluation can not be made using jitter. In particular, the evaluation can be made even when the minimum size of the recording marks is 1.0×λ/4/NA or less, which is the resolution limit. Therefore, the evaluation method can be used even when the recording density increases in the future.

Moreover, in the present embodiment, the difference between the real signal and the ideal signal is totalized for each signal level. Therefore, the real signal can be evaluated for each signal level. If the quality of the signal is evaluated for all the signal levels in the encode method used, the suitability of the combination of the recording medium and the recording strategy can be examined objectively. In addition, in the present embodiment, the average of the voltage values of the real signal is computed for each signal level, and the difference between the computed average and that of the ideal signal is determined. If such an evaluation method is employed, the quality of the signal can be evaluated by using a simple apparatus.

In the present embodiment, the average of the signal for each signal level is used, but the present invention is not limited thereto. The voltage values of the real signal may be collected for each signal level, and the mode of the collected voltage values may be used for comparison with the ideal signal. In this case, the influence of an abrupt change in the read signal due to surface defects in the recording medium can be completely eliminated.

Moreover, in the present embodiment, the data is normalized such that each of the minimum and maximum signal levels of the statistics of the voltage values is set to a predetermined value, and the linearity of the data is evaluated using the normalized data. Therefore, the signal can be evaluated based not only on the individual signal levels but also on the entire level difference.

Furthermore, in the present embodiment, the variation evaluation statistics such as the variances are used in addition to the above level evaluation statistics, so that the instability of the real signal can be evaluated. In particular, in the present embodiment, both the level evaluation statistics such as the average values and the variation evaluation statistics such as the variances are used, so that the quality of the signal can be evaluated from different points of view. For example, the level evaluation statistics allow evaluation of the deviation of the voltage levels of the real signal from those of the ideal signal. In addition, the variation evaluation statistics allow evaluation of the stability of the voltage levels.

In the evaluation method of the present embodiment, the statistical analysis is performed using both the ideal signal and the real signal. Therefore, the evaluation can be properly made even when some disturbances occur in the ideal signal. Specifically, the ideal signal itself is not necessarily a perfectly ideal signal. A signal close to the perfectly ideal signal to a certain extent can be used as the ideal signal. For example, a most likelihood ideal signal obtained by decoding the real signal using the PRML processing unit 110 may be used as the ideal signal, and the statistical evaluation may be made using the difference between the real signal and the thus-obtained ideal signal. Even if the bit error rate of the most likelihood ideal signal is of the order of $10^{-3}$, which is in general a poor level, this bit error rate is negligibly small in the statistical analysis. Therefore, even when the reading apparatus 100 employing the PRML detection method is used without modification, the quality of the recording strategy can be objectively evaluated by effectively utilizing the PRML detection method.

In particular, in the evaluation method of the present embodiment, the statistical analysis is performed using a large amount of data. Therefore, the evaluation can be made even when the bit rate error at the time of obtaining the ideal signal is relatively large. Specifically, since the data for evaluation contains about 10,000 or more of sequences of 0's and 1's, preferably several ten thousand to several hundred thousand bit sequences, a small amount of error can be tolerated. When the bit error rate of an identified signal obtained by processing a real signal using the PRML detection method is too high, the degree of agreement between the obtained ideal waveform and the perfectly ideal waveform is low, so that the quality of evaluation can be adversely affected. Accordingly, it is preferable to use as the ideal signal an identified signal having a bit error rate of substantially $10^{-2}$ or less.

In the above embodiment, the suitability of each of a plurality of recording strategies is evaluated by means of the signal evaluation method of the present embodiment, but the present invention is not limited thereto. For example, an optimal system can be configured by changing the material of the optical recording medium, the wavelength of the laser beam, and the like. In particular, in this evaluation method, since the influence of the signal processing in the PRML processing unit 110 is reduced, the recording and reading system itself can be evaluated. In addition, as in a conventional evaluation method using jitter, in this evaluation method, the objectivity of evaluation is ensured.

In another exemplary embodiment, a plurality of PRML reference class characteristics for determining the ideal signal are used. In this case, it is possible to determine what type of PRML reference class can be used for forming an allowable waveform of the real signal. Specifically, for example, a first ideal waveform is formed by subjecting binary data of approximately 10,000 to approximately 20,000 clock cycles to convolution with a constraint length 5 (1, 2, 2, 2, 1) characteristic, and a second ideal waveform is formed by subjecting the binary data to convolution with a constraint length 4 (1, 2, 2, 1) characteristic. Then, the waveform of a real signal obtained by reading the recorded binary data is synchronized with each of the two ideal waveforms, and the evaluation of the real signal can be made for each of the two ideal waveforms. If the linearity and variance deteriorate in the case where the second ideal waveform is used and are satisfactory in the case where the first ideal waveform is used, it is preferable to use a PRML processing unit 110 with the constraint length 5 (1, 2, 2, 2, 1) characteristic.

In the present embodiment, the waveform of the real signal is not subjected to any signal processing, but the present invention is not limited thereto. For example, a waveform subjected to PR equalization using an equalizer similar to that used in a real system can be used as the waveform of the real signal. Moreover, in FIGS. 5 and 6, the level of the signal is plotted on the horizontal axis, and the average level is plotted on the vertical axis. In this case, the method for quantifying the allowable deviation from linearity, the determination of the tolerance of deviation from linearity, and the determination of the tolerance of the variance at each level are determined depending on an actual system. In addition, which of the amount of deviation from linearity and the amount of the variance is emphasized when the signal is evaluated may be determined according to an actual system.

Moreover, in the present embodiment, the difference between the ideal waveform and the actual waveform is collected for each signal level and is statistically analyzed in the voltage level collecting unit 118B, but the present invention is not limited thereto. For example, the difference between the ideal waveform and the waveform of the real signal may be collected and statistically analyzed for each of the types of signal bit sequences. In this case, it is preferable to use the difference in voltage level or the degree of variations in voltage level as the difference between the ideal waveform and the waveform of the real signal. In this manner, the quality of the signal can be determined for each signal bit sequence. Therefore, the recording and reading quality can be improved by controlling the strategy for recording and reading a specific signal bit sequence.

Furthermore, in the present embodiment, the variance is used as a measure of variations in the real signal, but the present invention is not limited thereto. For example, other measures such as the range of the variations can be used.

The signal evaluation method and optical recording and reading method of the present invention are not limited to those described in the above embodiments. Of course, various modifications may be made without departing from the spirit of the present invention.

The present invention can be used in various fields in which optical recording and reading is performed using a laser beam or the like.

The entire disclosure of Japanese Patent Application No. 2007-123003 filed on May 5, 2007 including specification, claims, drawings, and summary are incorporated herein by reference in its entirety.

What is claimed is:

1. A signal evaluation method for evaluating a signal when optical recording and reading is performed by irradiating a medium with a laser beam having a wavelength of $\lambda$ through an objective lens having a numerical aperture of NA, the method comprising:

statistically analyzing information of a difference between an ideal signal recoded in the medium, which is formed in a plurality of signal levels by convolution with a reference class characteristic of Partial Response (PR) and a real signal obtained by irradiating the medium with the laser beam, the information being statistically analyzed by collecting the difference at the same signal level of the ideal signal through each bit sequence and evaluating a quality of the real signal using a statistic obtained by statistically analyzing the information.

2. The signal evaluation method according to claim 1, wherein a minimum size of recording marks to be recorded in the medium is equal to or less than $1.1 \times \lambda/(4 \times NA)$.

3. The signal evaluation method according to claim 2, wherein a maximum likelihood ideal signal obtained from the real signal by means of a PRML detection method is used as the ideal signal recorded in the medium.

4. The signal evaluation method according to claim 2, wherein a level evaluation statistic obtained by statistically analyzing a level difference between a signal level of the ideal signal and a corresponding signal level of the real signal is used as the statistic.

5. The signal evaluation method according to claim 2, wherein a variation evaluation statistic obtained by statistically analyzing the degree of level variations in the real signal at each signal level with respect to a corresponding signal level of the ideal signal is used as the statistic.

6. The signal evaluation method according to claim 1, wherein a maximum likelihood ideal signal obtained from the real signal by means of a PRML detection method is used as the ideal signal recorded in the medium.

7. The signal evaluation method according to claim 1, wherein a signal computed from a known data sequence stored in storage means other than the medium is used as the ideal signal in place of the ideal signal recorded in the medium.

8. The signal evaluation method according to claim 7, wherein a level evaluation statistic obtained by statistically analyzing a level difference between a signal level of the ideal signal and a corresponding signal level of the real signal is used as the statistic.

9. The signal evaluation method according to claim 7, wherein a variation evaluation statistic obtained by statistically analyzing the degree of level variations in the real signal at each signal level with respect to a corresponding signal level of the ideal signal is used as the statistic.

10. The signal evaluation method according to claim 9, wherein variance of the real signal at each signal level with respect to a corresponding signal level of the ideal signal is used as the variation evaluation statistic.

11. The signal evaluation method according to claim 1, wherein a level evaluation statistic obtained by statistically analyzing a level difference between a signal level of the ideal signal and a corresponding signal level of the real signal is used as the statistic.

12. The signal evaluation method according to claim 11, wherein a level difference between an average level value of the real signal at each signal level and a corresponding signal level of the ideal signal is used as the level evaluation statistic.

13. The signal evaluation method according to claim 11, wherein a level difference between a mode of the real signal at each signal level and a corresponding signal level of the ideal signal is used as the level evaluation statistic.

14. The signal evaluation method according to claim 11, wherein the quality of the real signal is evaluated using linearity of the level evaluation statistic.

15. The signal evaluation method according to claim 11, wherein a variation evaluation statistic obtained by statistically analyzing the degree of level variations in the real signal at each signal level with respect to a corresponding signal level of the ideal signal is used as the statistic.

16. The signal evaluation method according to claim 1, wherein a variation evaluation statistic obtained by statistically analyzing the degree of level variations in the real signal at each signal level with respect to a corresponding signal level of the ideal signal is used as the statistic.

17. The signal evaluation method according to claim 16, wherein variance of the real signal at each signal level with respect to a corresponding signal level of the ideal signal is used as the variation evaluation statistic.

18. An optical recording and reading method for performing recording and reading by irradiating a medium with a laser beam having a wavelength of $\lambda$ through an objective lens having a numerical aperture of NA, the method comprising:

statistically analyzing information of a difference between an ideal signal recoded in the medium, which is formed in a plurality of signal levels by convolution with a reference class characteristic of Partial Response (PR)

and a real signal obtained by irradiating the medium with the laser beam, the information being statistically analyzed by collecting the difference at the same signal level of the ideal signal through each bit sequence evaluating a quality of the real signal using a statistic obtained by statistically analyzing the information before or during the recording and reading; and adjusting a recording strategy based on the results of the evaluation.

19. The optical recording and reading method according to claim 18, wherein a maximum likelihood ideal signal obtained from the real signal by means of a PRML detection method is used as the ideal signal recorded in the medium.

* * * * *